US 6,580,574 B1

(12) United States Patent
Codilian (10) Patent No.: US 6,580,574 B1
(45) Date of Patent: Jun. 17, 2003

(54) MOBILE DEVICE COMPRISING A DISK STORAGE SYSTEM PROTECTED BY A PRESSURE-SENSITIVE DETECTOR

(75) Inventor: Raffi Codilian, Irvine, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 250 days.

(21) Appl. No.: 09/866,001

(22) Filed: May 25, 2001

(51) Int. Cl.⁷ .............................................. G11B 19/04
(52) U.S. Cl. ............................ 360/60; 360/75; 360/68
(58) Field of Search ............................ 360/60, 97.02, 360/31, 75, 69, 46, 67, 68

(56) References Cited

U.S. PATENT DOCUMENTS 5,825,581 A * 10/1998 Morita ..................... 360/78.04
5,956,194 A * 9/1999 Ohmi .......................... 360/60
5,963,392 A    10/1999 Sri-Jayantha et al.
5,982,573 A    11/1999 Henze
6,101,062 A    8/2000  Jen et al.

OTHER PUBLICATIONS

Micro Switch Force Sensors, Honeywell.

* cited by examiner

Primary Examiner—Alan T. Faber
(74) Attorney, Agent, or Firm—Milad G. Shara, Esq.; Howard H. Sheerin, Esq.

(57) ABSTRACT

A mobile device is disclosed comprising a disk storage system comprising a disk and a head actuated over the disk, the disk comprising a data area. The mobile device further comprises a pressure-sensitive detector for detecting a pressure on the mobile device, and for detecting a decrease in the pressure on the mobile device indicating the mobile device may have been dropped. When the pressure-sensitive detector detects the decrease in the pressure, retracting circuitry within the mobile device retracts the head to a retracted position away from the data area of the disk.

44 Claims, 8 Drawing Sheets

MOBILE DEVICE COMPRISING A DISK STORAGE SYSTEM PROTECTED BY A PRESSURE-SENSITIVE DETECTOR

BACKGROUND OF THE INVENTION

1. Field of the Invention

The present invention relates to mobile devices. More particularly, the present invention relates to a mobile device comprising a disk storage system protected by a pressure-sensitive detector.

2. Description of the Prior Art

Integrating a disk storage system into a mobile device (e.g., a handheld computer such as a personal digital assistant (PDA), cellular phone, digital camera, tablet computer, etc.) provides a significant amount of non-volatile data storage for a relatively low cost. A disk storage system comprises a head flying just above the surface of a rotating disk. The head is attached to the distal end of an actuator arm which is rotated about a pivot by a voice coil motor in order to actuate the head over the disk. The disk comprises a magnetic coating which is magnetized by an inductive element in the head in order to write magnetic transitions onto the surface of the disk representing the recorded data. During a read operation, a read element in the head (e.g., inductive or magnetoresistive) detects the magnetic transitions to generate a read signal that is demodulated into an estimated data sequence representing the recorded digital data. Physical shocks can cause the head and actuator arm assembly to deviate off track and over-write data in adjacent tracks before the servo system detects the error. In addition, the head and the media can be damaged if the head "slaps" onto the surface of the disk. Physical shocks due to being dropped are of particular concern for mobile devices.

There is, therefore, a need to detect when a mobile device may have been dropped so that protective measures can be taken to prevent damage to the heads or media of a disk storage system incorporated into the mobile device.

SUMMARY OF THE INVENTION

The present invention may be regarded as a mobile device comprising a disk storage system including a disk and a head actuated over the disk, wherein the disk comprises a data area. The mobile device further comprises a pressure-sensitive detector for detecting a pressure on the mobile device, and for detecting a decrease in the pressure indicating the mobile device may have been dropped. When the pressure-sensitive detector detects the decrease in the pressure, retracting circuitry within the mobile device retracts the head to a retracted position away from the data area of the disk.

In one embodiment the head retracting circuit retracts the head to the retracted position when the pressure decreases substantially to zero.

In another embodiment, the pressure-sensitive detector comprises a first terminal and a second terminal, the pressure is detected when the terminals are pressed together, and the decrease in the pressure is detected when the terminals separate. In alternative embodiment, the pressure-sensitive detector comprises a piezoelectric sensor comprising at least one piezoresistor, wherein the resistance of the piezoresistor changes when pressure is applied to the piezoelectric sensor. In an alternative embodiment, the pressure-sensitive detector comprises a force sensor, such as a polymer layer disposed between a first and second conductive layers.

In yet another embodiment, the mobile device comprises a timer for timing a predetermined interval, wherein at the end of the predetermined interval the head is actuated away from the retracted position toward the data area of the disk. In an alternative embodiment, the head is locked in the retracted position until the pressure-sensitive detector detects the pressure on the mobile device.

In one embodiment, the pressure is due to a user holding the mobile device. In still another embodiment, the pressure is due to the mobile device contacting a surface (such as a desk).

In another embodiment, the mobile device comprises interface circuitry for connecting to a docking port, and the pressure-sensitive detector is disabled while the mobile device is connected to the docking port.

The present invention may also be regarded as a method of operating a mobile device comprising a disk storage system including a disk and a head actuated over the disk, wherein the disk comprises a data area. The method comprises the steps of detecting a pressure on the mobile device, detecting a decrease in the pressure on the mobile device indicating the mobile device may have been dropped, and retracting the head to a retracted position away from the data area of the disk when the decrease in the pressure is detected.

The present invention may also be regarded as a mobile device comprising a disk storage system comprising a disk, a head actuated over the disk, and a preamp for applying a write current to the head during a write operation. The mobile device further comprises a pressure-sensitive detector for detecting a pressure on the mobile device, and for detecting a decrease in the pressure on the mobile device indicating the mobile device may have been dropped, wherein when the decrease in the pressure is detected the write current is disabled.

The present invention may also be regarded as a method of operating a mobile device comprising a disk storage system comprising a disk and a head actuated over the disk, wherein a write current is applied to the head during a write operation. The method comprises the steps of detecting a pressure on the mobile device, detecting a decrease in the pressure on the mobile device indicating the mobile device may have been dropped, and disabling the write current when the decrease in the pressure is detected.

DESCRIPTION OF THE PREFERRED EMBODIMENTS

Figure 1:
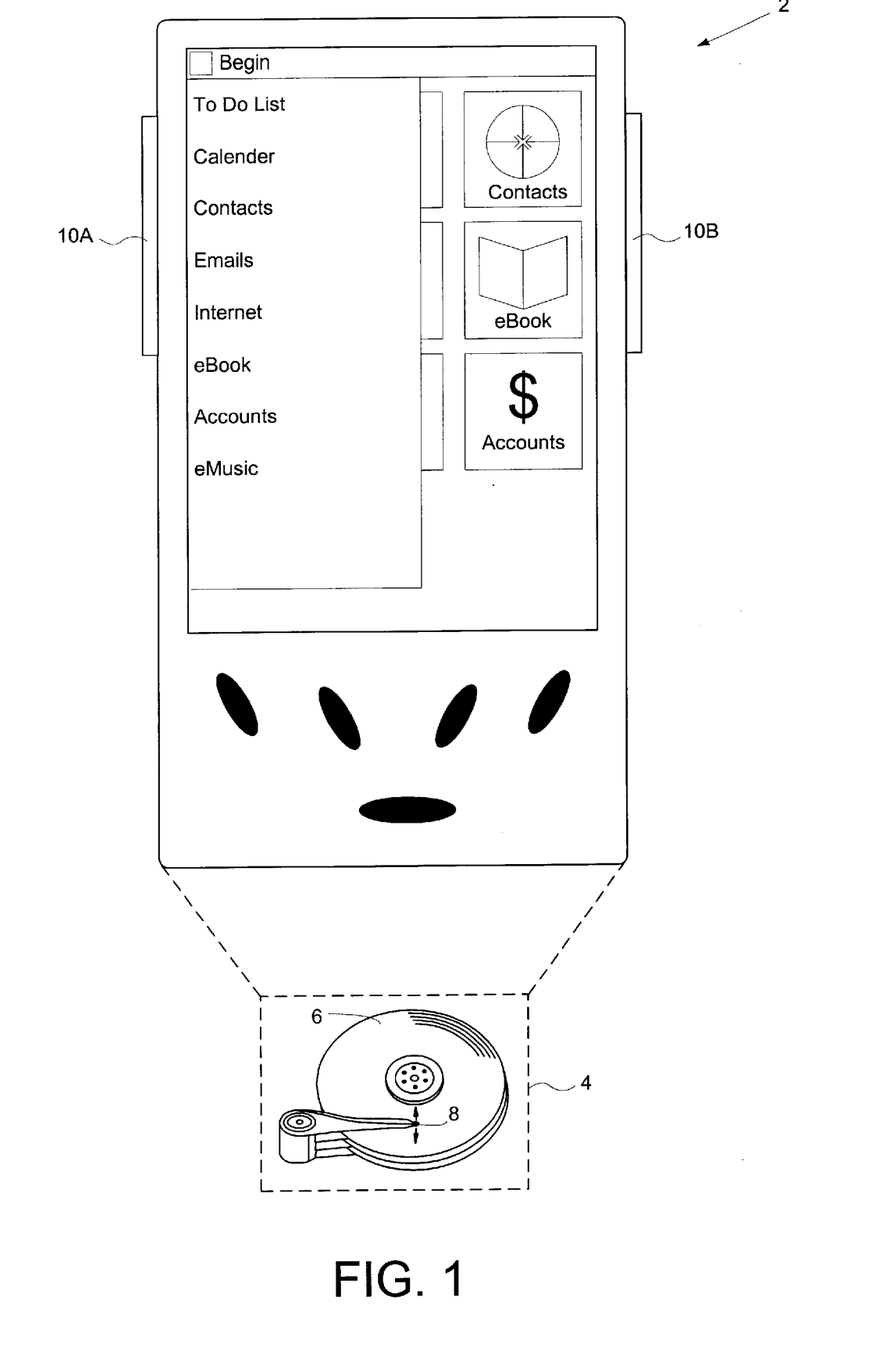
FIG. 1 is a mobile device according to an embodiment of the present invention comprising a disk storage system and two pressure-sensitive detectors located on the sides of the mobile device for retracting the head if the mobile device is dropped.

FIG. 1 shows a mobile device 2 according to an embodiment of the present invention comprising a disk storage system 4 including a disk 6 and a head 8 actuated over the disk 6, wherein the disk comprises a data area. The mobile device 2 further comprises a pressure-sensitive detector 10A for detecting a pressure on the mobile device 2, and for detecting a decrease in the pressure indicating on the mobile device the mobile device 2 may have been dropped. When the pressure-sensitive detector 10A detects the decrease in the pressure, retracting circuitry within the mobile device 2 retracts the head 8 to a retracted position away from the data area of the disk 6.

In one embodiment, the retracting circuit retracts the head 8 to the retracted position when the pressure, decreases substantially to zero (e.g., when the pressure decreases to within 10% of the pressure-sensitive detector's maximum output level).

The embodiment of FIG. 1 employs two pressure-sensitive detectors 10A and 10B located on either side of the mobile device 2. Any number of pressure-sensitive detectors may be employed, and in one embodiment, the entire enclosure of the mobile device 2 is pressure-sensitive.

Figure 2:
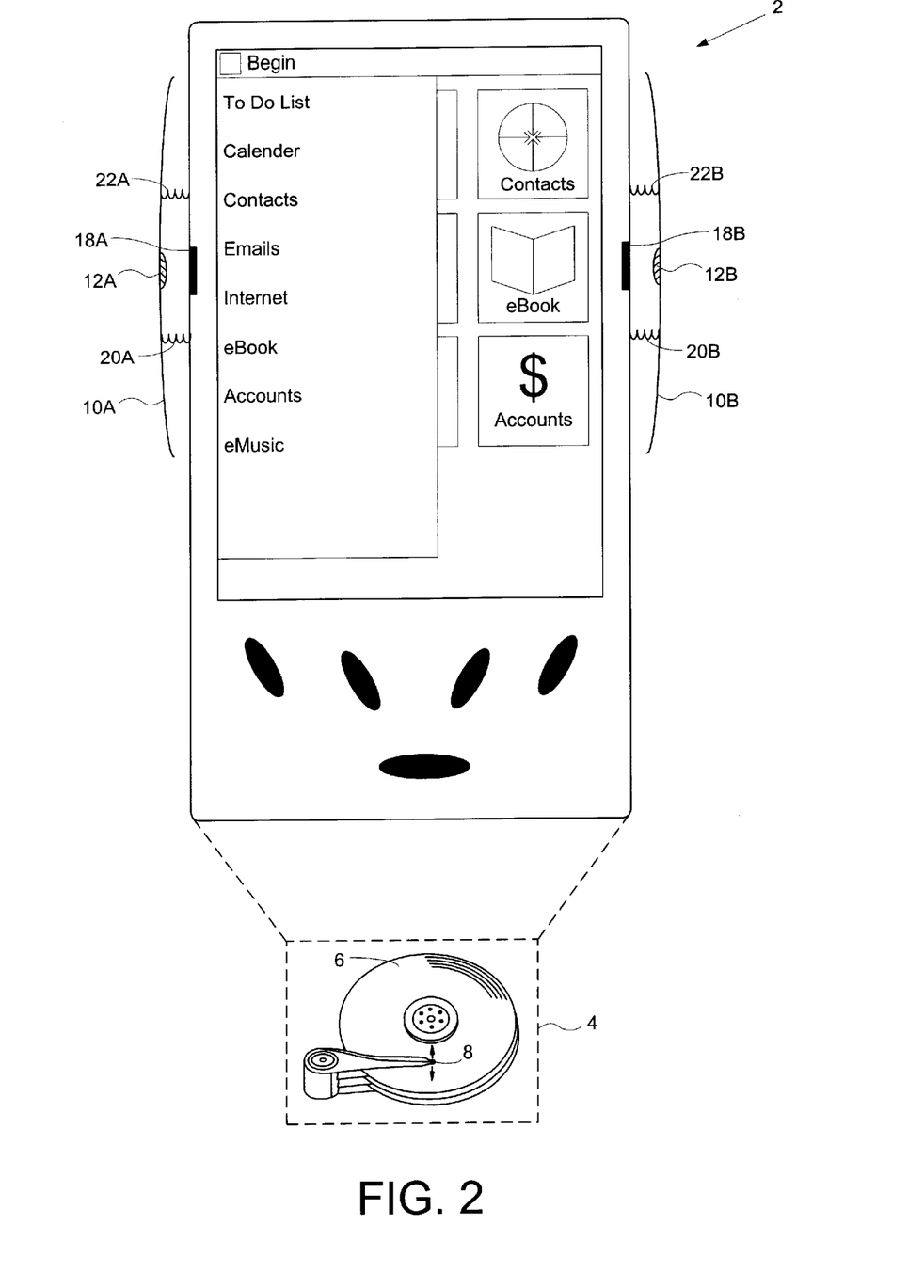
FIG. 2 is a mobile device according to an embodiment of the present invention wherein the pressure sensitive detector comprises a contact sensor.

FIG. 2 shows an embodiment wherein the pressure-sensitive detector 10A comprises a contact sensor. The contact sensor comprises a first terminal 12A which contacts a second terminal 18A when pressed together. The body of pressure-sensitive detector 10A comprises an elastic material, such as plastic, formed into a curved shape. A pair of springs 20A and 22A provide a biasing force to push the first terminal 12A away from the second terminal 18A.

Figure 3A:
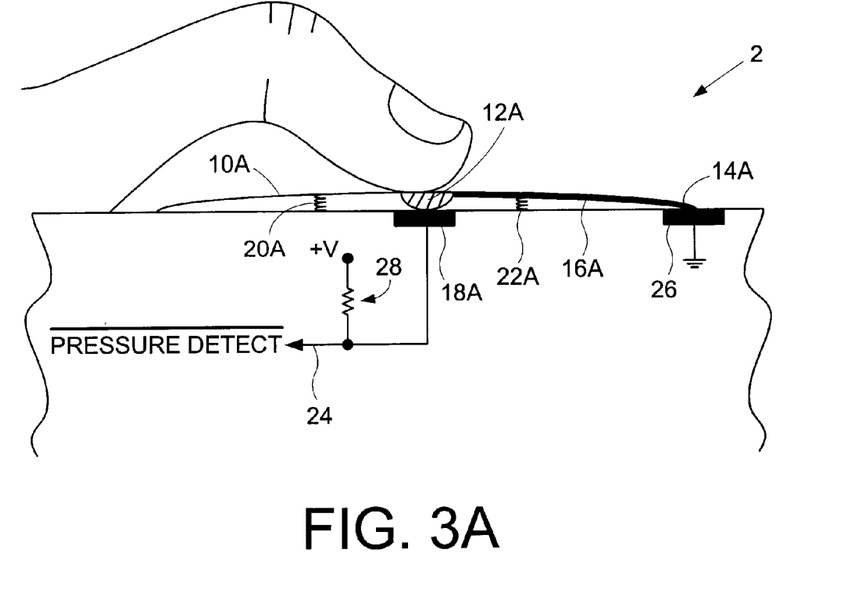
FIGS. 3A and 3B illustrate the operation of the pressure-sensitive detector of FIG. 2.
Figure 3B:
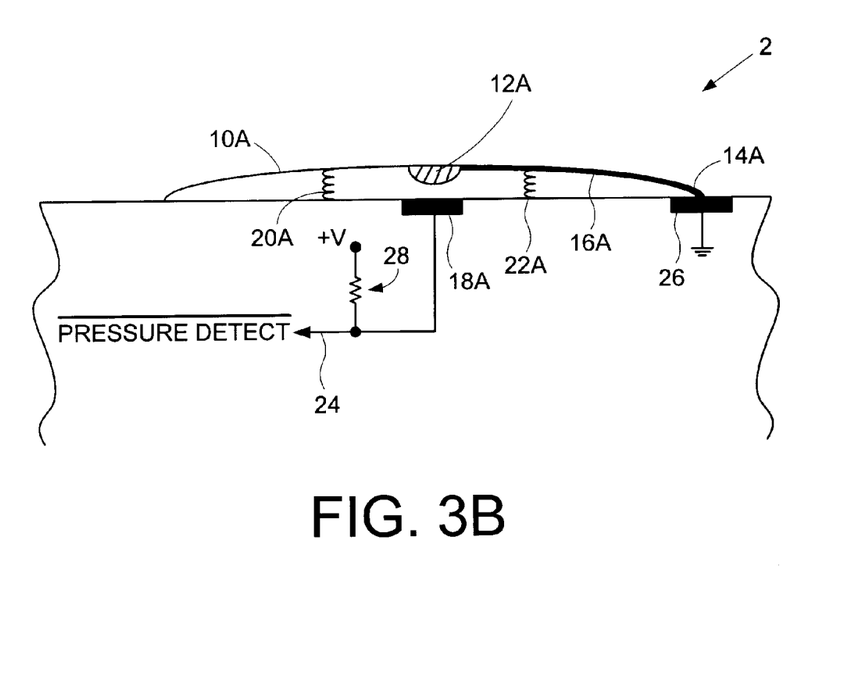

FIG. 3A shows further details of the pressure-sensitive detector 10A of FIG. 2, including circuitry for generating a pressure detect signal 24 when the user is pressing on the pressure-sensitive detector 10A. An end 14A of the pressure sensitive detector 10A is connected to a ground terminal 26 and to the first terminal 12A through a conductive lead 16A so that when the first terminal 12A contacts the second terminal 18A, the pressure detect signal 24 is grounded active low). As shown in FIG. 3B, if the user drops the mobile device 2 the springs 20A and 22A push the first terminal 12A away from the second terminal 18A connecting the pressure detect signal 24 to a positive voltage via a pull-up resistor 28.

Figure 4:
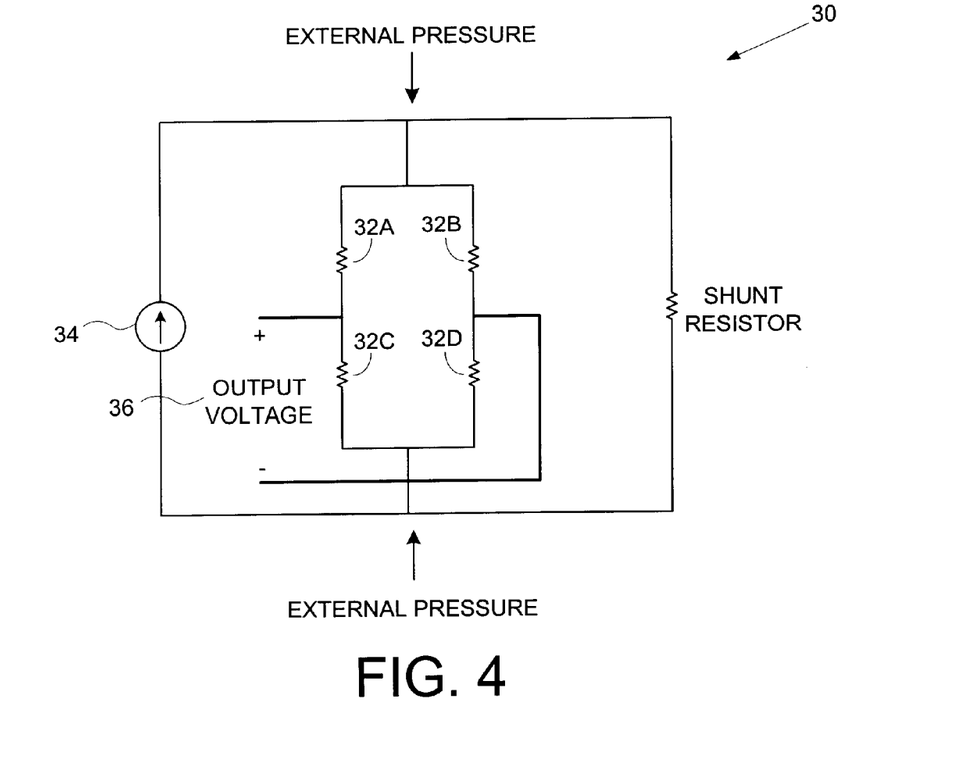
FIG. 4 shows an alternative embodiment of a pressure-sensitive detector comprising a piezoelectric sensor comprising at least one piezoresistor, wherein the resistance of the piezoresistor changes when the user pushes on the piezoelectric sensor.

Any suitable pressure-sensitive detector may be employed for detecting the pressure on the mobile device, including contact sensors for sensing a contact or touch, pressure sensors for sensing a force per unit area, and force sensors for sensing a force. FIG. 4 shows an embodiment of a pressure-sensitive detector 30 comprising a piezoelectric sensor. The piezoelectric sensor comprises four piezoresistors 32A–32D having a resistance that changes when the user pushes on the piezoelectric sensor. A current source 34 generates a current applied to the piezoresistors 32A–32D, and an output voltage 36 is generated with respect to the piezoresistors 32A–32D which varies with the amount of external pressure applied to the piezoelectric sensor. The output voltage 36 is compared to a predetermined threshold (not shown) to generate the pressure detect signal 24 of FIG. 3A. The LPM 562 piezoelectric sensor from Cooper Instruments and Systems in Warrenton, Va. is an example piezoelectric sensor that may be employed in an embodiment of the present invention.

Figure 5:
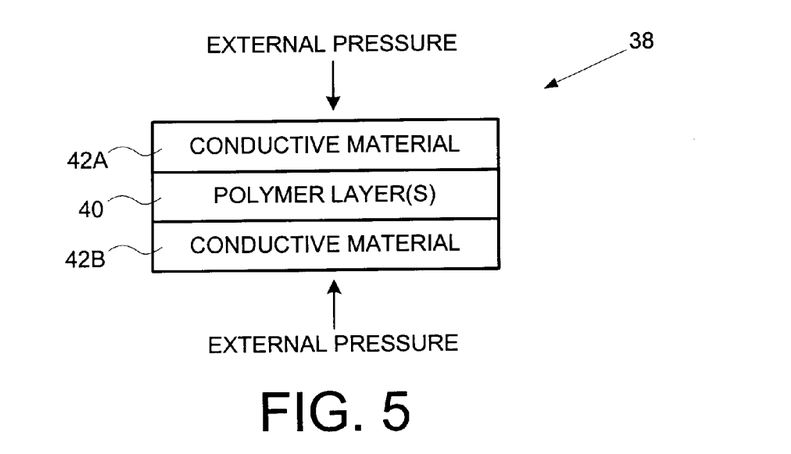
FIG. 5 shows an alternative embodiment of a pressure-sensitive detector comprising a force sensor including a polymer layer disposed between a first and second conductive layers.

FIG. 5 shows an alternative embodiment for a pressure sensitive detector 38 which comprises a force sensor including a polymer layer 40 disposed between a first and second conductive layers 42A and 42B. The elasticity of the polymer layer 40 varies with an applied external pressure for implementing the pressure sensitive detector. The C-Sensor from Serena Industries, Inc. in Sunnyvale, Calif. is an example force sensor that may be employed in an embodiment of the present invention.

Figure 6:
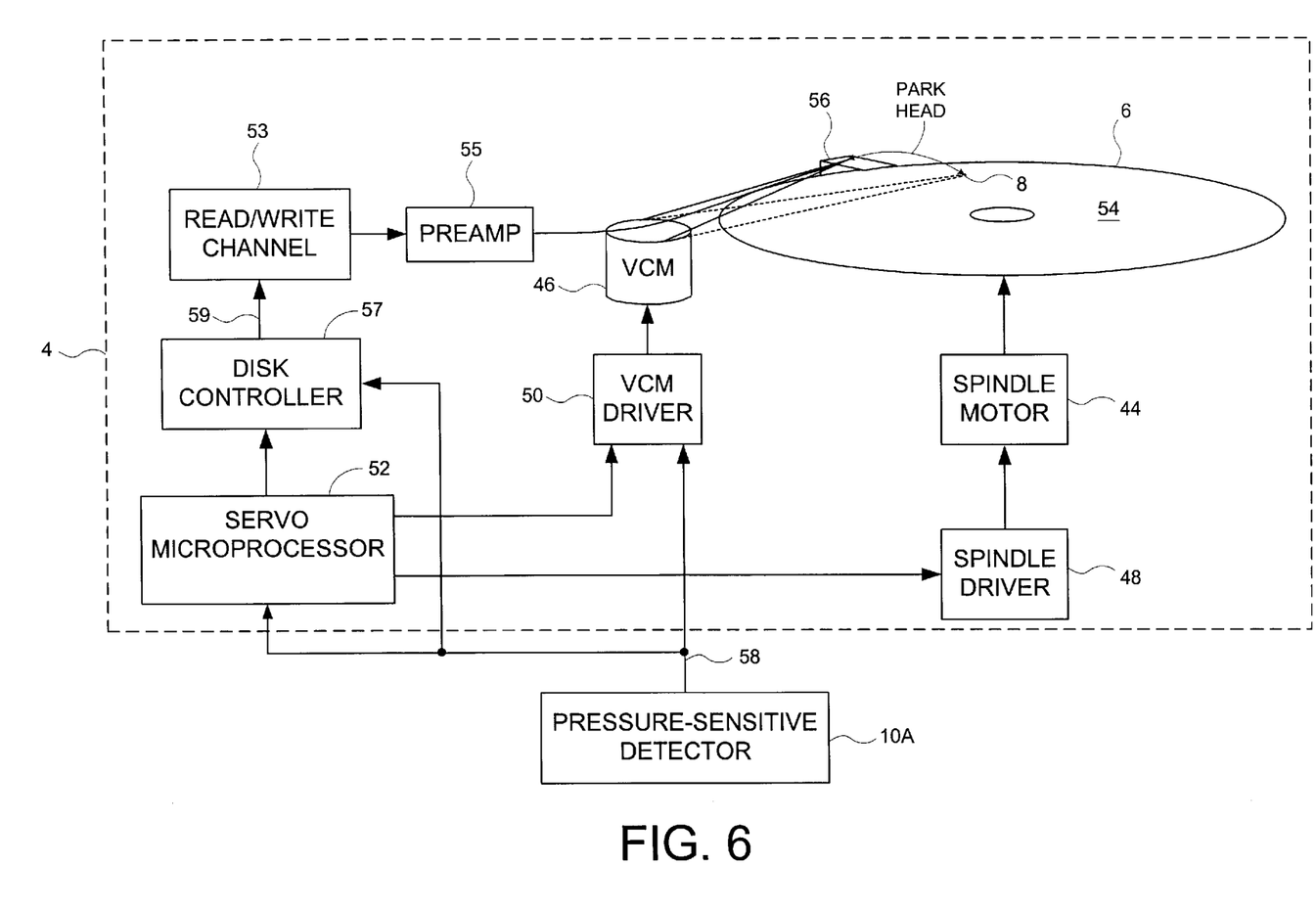
FIG. 6 shows further details of the disk storage system and circuitry for disabling a write current and retracting the head when a SHOCK-EXPECTED CONDITION is detected.

FIG. 6 shows further details of a suitable disk storage system 4 and pressure sensitive detector 10A for use in the mobile device 2 of FIG. 1. The disk 6 is rotated by a spindle motor 44 and the head 8 is actuated over the disk 6 by a voice coil motor (VCM) 46. Spindle driver circuitry 48 controls the spindle motor 44, and VCM driver circuitry 50 controls the VCM 46. A servo microprocessor 52 generates control signals applied to the spindle motor driver 48 and VCM driver 50. A read/write channel 53 provides write data to a preamp 55 which generates a write current applied to the head 8 during write operations, and processes a read signal generated by the head 8 and amplified by the preamp 55 during read operations. A disk controller 57 activates a write gate signal 59 applied to the preamp 55 through the read channel 53 to enable the write current at the appropriate time with respect to the data sectors recorded on the disk 6. During normal operation the servo microprocessor 52 generates control signals to actuate the head 8 over a the data area 54 of the disk 6. In the embodiment of FIG. 6, the disk storage system 4 comprises a ramp 56 at the periphery of the disk 6 for parking the head 8 when the mobile device is powered down. In an alternative embodiment, the disk 6 comprises a landing zone (e.g., at the inner diameter of the disk) where the head 8 is parked.

When a shock is predicted (SHOCK-DETECTED CONDITION), the pressure-sensitive detector 10A generates a SHOCK-EXPECTED SIGNAL 58 applied to the servo microprocessor 52 which generates the appropriate control signals for the disk controller 57 to disable the write current via the write gate signal 59 and for the VCM driver 50 to retract the head 8 away from the data area 54 of the disk 6. In an alternative embodiment, the SHOCK-EXPECTED SIGNAL 58 is applied directly to the disk controller 57 and VCM driver 50 in order to disable the write current and retract the head 6 independent of the servo microprocessor 52 which may malfunction. In yet another embodiment, the write current is disabled without retracting the head 8 to avoid the associated latency while still protecting against off-track write errors.

Any suitable technique may be employed to disable the write current. For example, in one embodiment the SHOCK-EXPECTED SIGNAL 58 is applied directly to the read/write channel 53 for disabling the write current. In another embodiment, the SHOCK-EXPECTED SIGNAL 58 disables the power supplied to the preamp 55.

In one embodiment, when a SHOCK-EXPECTED CONDITION is detected, the head 8 is parked (e.g., on the ramp 56 of FIG. 6 or on a landing zone on the disk 6) and the disk 6 is spun down. In an alternative embodiment, the head 8 is retracted away from the data area 54 of the disk 6 without parking the head 8 or spinning down the disk 6. For example, the head 8 may be retracted radially away from the data area 54 to a predetermined "safe zone" which may be on or off the disk 6. In another embodiment, the head 8 is retracted vertically away from the data area 24 of the disk 6.

In one embodiment, the disk 6, head 8, spindle motor 44, VCM 46, and preamp 55 are implemented within a head disk assembly (HDA), and the remaining circuitry (spindle driver 48, VCM driver 50, read/write channel 53, and servo microprocessor 52) are mounted on a printed circuit board (PCB) integrated as part of the disk storage system 4. In an alternative embodiment, the spindle driver 48, VCM driver 50, read/write channel 53 and servo microprocessor 52 are integrated with the circuitry on the PCB of the mobile device.

Figure 7:
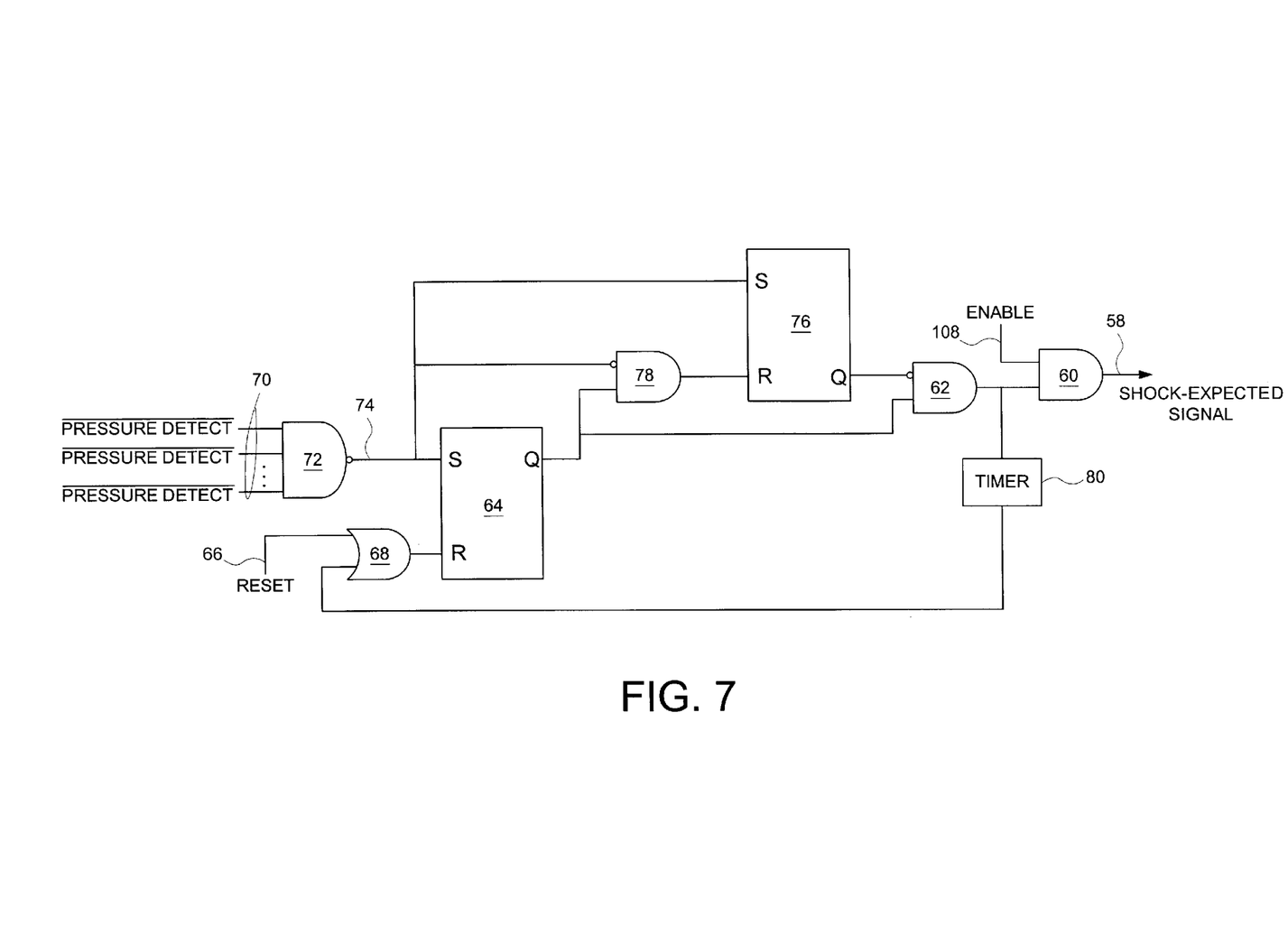
FIG. 7 shows circuitry according to an embodiment of the present invention for activating a SHOCK-EXPECTED SIGNAL, and for resetting the SHOCK-EXPECTED SIGNAL after a predetermined interval.

FIG. 7 shows circuitry in pressure-sensitive detector 10A for generating the SHOCK-EXPECTED SIGNAL 58 according to an embodiment of the present invention. The SHOCK-EXPECTED SIGNAL 58 is initialized to an inactive low state via AND gates 60 and 62 by resetting S/R flip-flop 64 via reset signal 66 and OR gate 68. A plurality of pressure detect signals 70 (active low) are generated by respective pressure sensors. When at least one of the pressure sensors is activated (due, for example, to the user holding the mobile device), NAND gate 72 activates line 74 to set SIR flip-flop 64 and S/R flip-flop 76. When all of the pressure detect signals 70 become inactive (indicating the user may have dropped the mobile device) S/R flip-flop 76 is reset via AND gate 78 and the SHOCK-EXPECTED SIGNAL 58 is activated via AND gates 60 and 62. In addition, a timer 80 is started which resets the SHOCK-EXPECTED SIGNAL 58 by resetting S/R flip-flop 64 via OR gate 68 after a predetermined interval. It is presumed that a shock from dropping the mobile device will have subsided by the end of the predetermined interval. In one embodiment, the predetermined time interval is about 1 second. When the SHOCK-EXPECTED SIGNAL 58 is reset, the head 8 is "unlocked" so that it may be loaded back onto the data area 54 of the disk 6.

In an alternative embodiment, in place of or in addition to the timer 80, the mobile device comprises circuitry for detecting the actual shock and for detecting when the effects from the shock have subsided to a safe level. In one embodiment the mobile device comprises an accelerometer capable of detecting an acceleration of the mobile device. The shock is considered subsided when the output of the accelerometer falls below a predetermined threshold. In another embodiment, the mobile device evaluates the current applied to the spindle motor, and the shock is considered subsided when the current applied to the spindle motor stabilizes.

Figure 8:
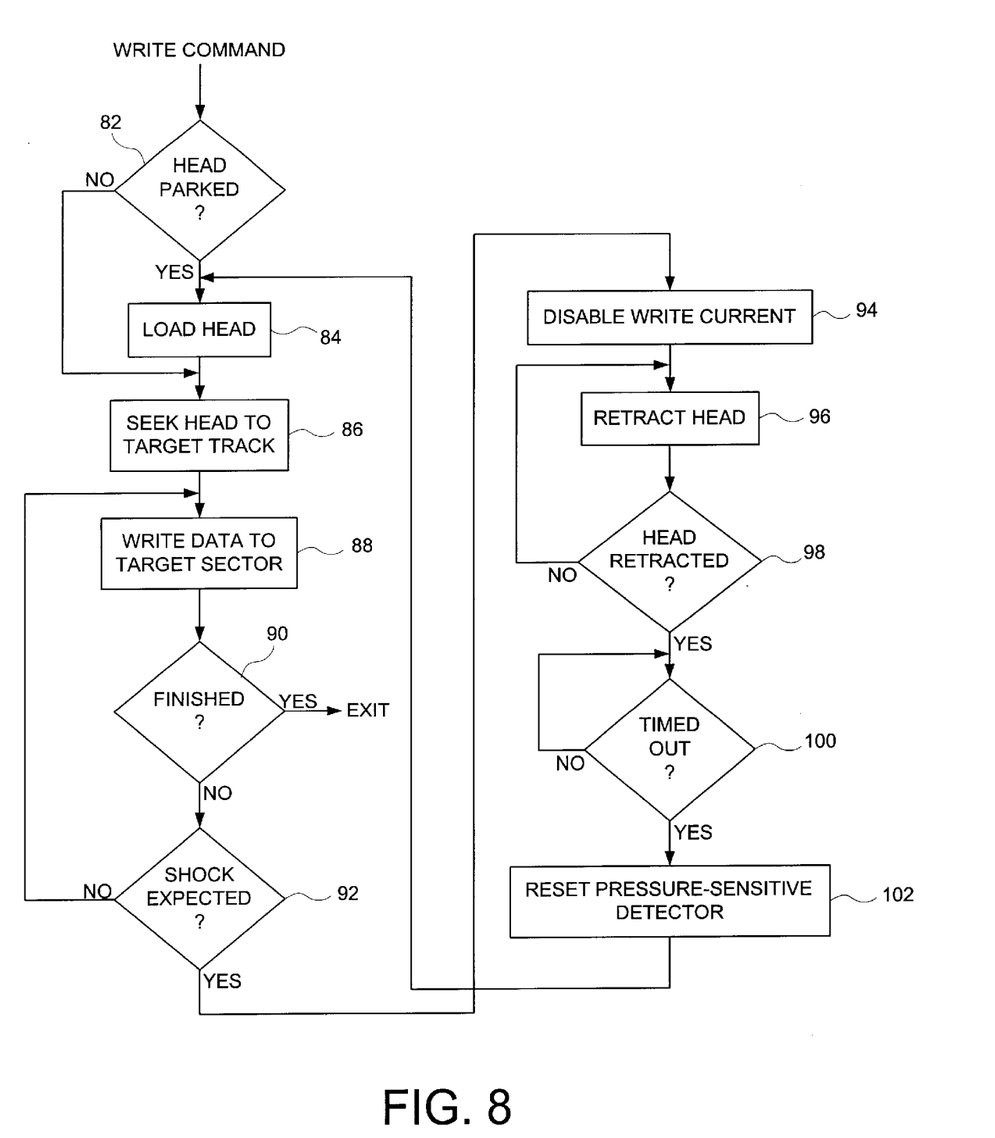
FIG. 8 is a flow diagram according to an embodiment of the present invention illustrating the operation of the mobile device when a SHOCK-EXPECTED CONDITION is detected during a write operation.

FIG. 8 is a flow chart according to an embodiment of the present invention illustrating the steps executed when a SHOCK-EXPECTED CONDITION is detected during a write operation. If at step 82 the head is parked, at step 84 the head is loaded onto the data area of the disk. At step 86 a seek operation moves the head to the target track, and at step 88 data is written to a target data sector of the target track. If at step 90 all of the data is successfully written to the target data sector, then the write operation exits. In one embodiment, the head is parked on the ramp at the conclusion of a write operation.

If during the write operation a SHOCK-EXPECTED CONDITION is detected at step 92 (which in one embodiment is an asynchronous event with respect to the digital timing of the digital components), then at step 94 the write current is disabled and at step 96 the head is retracted. At step 98 the mobile device waits for the retract operation to finish, and then at step 100 the mobile device waits for a predetermined interval to ensure the shock has subsided. In one embodiment, the mobile device also comprises circuitry for determining that the shock has subsided at step 100. After the predetermined interval, at step 102 the pressure-sensitive detector is reset and control branches back to step 84 in order to reload the head and reattempt the write operation.

Figure 9:
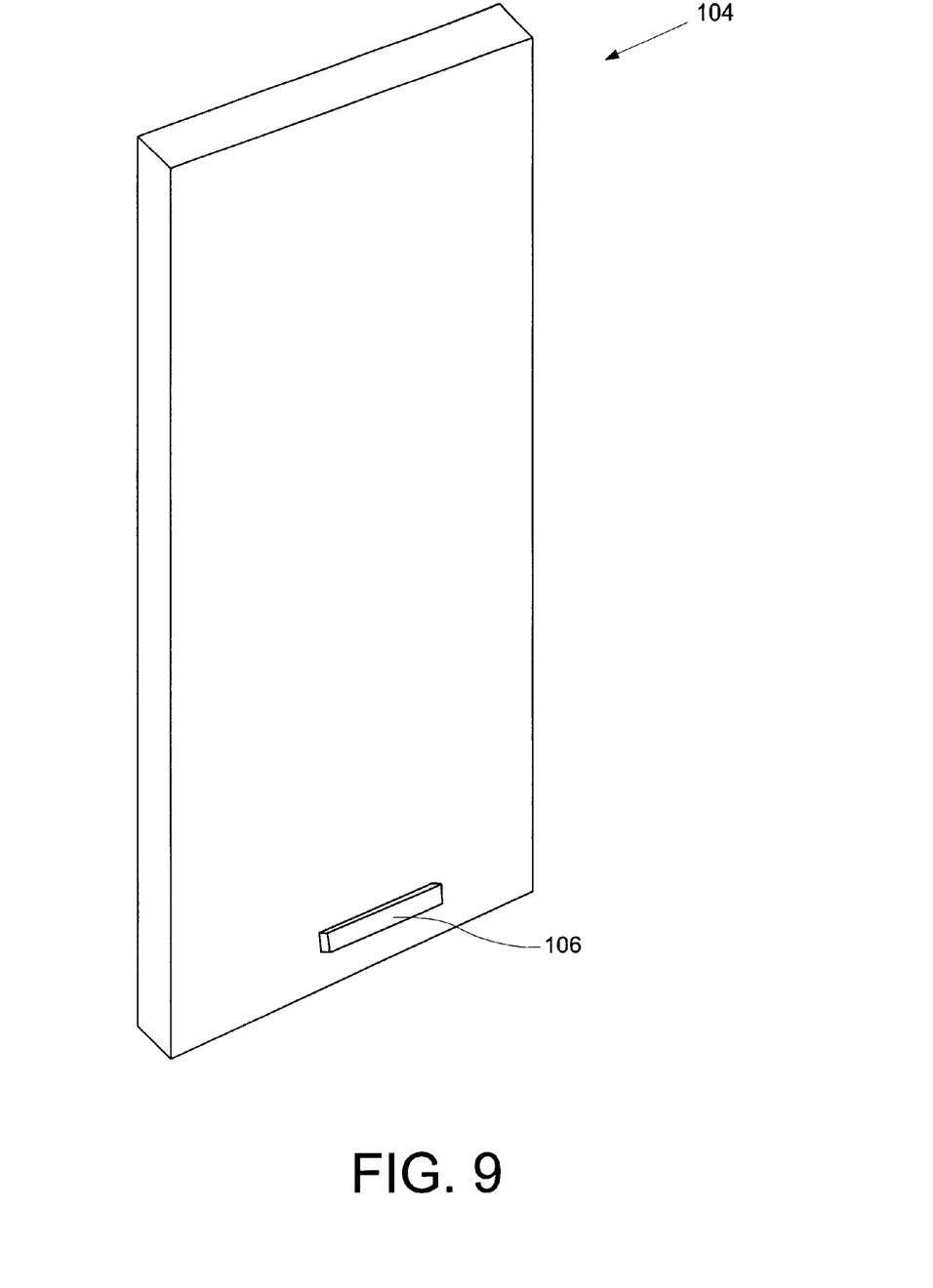
FIG. 9 shows a mobile device according to an embodiment of the present invention wherein a pressure-sensitive detector is mounted on the back of the mobile device and activated when the mobile device is placed onto a surface (e.g., a desk) or into a cradle.

FIG. 9 shows a mobile device 104 according to an embodiment of the present invention wherein a pressure-sensitive detector 106 is mounted on the back of the mobile device 104 and activated when the mobile device 104 is placed onto a surface (e.g., a desk) or into a cradle. In this manner the disk storage system 4 will operate even though the user is not holding the mobile device 104. In another embodiment, the mobile device comprises interface circuitry for connecting to a docking port, and the pressure-sensitive detector is disabled while the mobile device is connected to the docking port. Referring again to FIG. 7, an enable signal 108 is provided for disabling the SHOCK-EXPECTED SIGNAL 58 via AND gate 60.

I claim:

1. A mobile device comprising:
   a disk storage system comprising a disk and a head actuated over the disk, the disk comprising a data area;
   a pressure-sensitive detector for detecting a pressure on the mobile device, and for detecting a decrease in the pressure on the mobile device indicating the mobile device may have been dropped; and
   a retracting circuit for retracting the head to a retracted position away from the data area of the disk when the pressure-sensitive detector detects the decrease in the pressure.

2. The mobile device as recited in claim 1, wherein the retracting circuit retracts the head to the retracted position when the pressure decreases substantially to zero.

3. The mobile device as recited in claim 1, wherein:
   the pressure-sensitive detector comprises a first terminal and a second terminal;
   the pressure is detected when the terminals are pressed together; and
   the decrease in the pressure is detected when the terminals separate.

4. The mobile device as recited in claim 1, wherein:
   the pressure-sensitive detector comprises a piezoelectric sensor comprising at least one piezoresistor; and
   the resistance of the piezoresistor changes when pressure is applied to the piezoelectric sensor.

5. The mobile device as recited in claim 1, wherein the pressure-sensitive detector comprises a force sensor.

6. The mobile device as recited in claim 5, wherein the force sensor comprises a polymer layer disposed between a first and second conductive layers.

7. The mobile device as recited in claim 1, further comprising a timer for timing a predetermined interval, wherein at the end of the predetermined interval the head is actuated away from the retracted position toward the data area of the disk.

8. The mobile device as recited in claim 1, wherein the head is locked in the retracted position until the pressure-sensitive detector detects the pressure.

9. The mobile device as recited in claim 1, wherein the pressure is due to a user holding the mobile device.

10. The mobile device as recited in claim 1, wherein the pressure is due to the mobile device contacting a surface.

11. The mobile device as recited in claim 1, wherein:
the mobile device further comprises interface circuitry for connecting to a docking port; and
the pressure-sensitive detector is disabled while the mobile device is connected to the docking port.

12. A method of operating a mobile device, the mobile device comprising a disk storage system comprising a disk and a head actuated over the disk, the disk comprising a data area, the method comprising the steps of:
detecting a pressure on the mobile device;
detecting a decrease in the pressure on the mobile device indicating the mobile device may have been dropped; and
retracting the head to a retracted position away from the data area of the disk when the decrease in the pressure is detected.

13. The method as recited in claim 12, wherein the step of retracting the head is executed when the pressure decreases substantially to zero.

14. The method as recited in claim 12, wherein:
the pressure is detected when a first terminal and a second terminal are pressed together; and
the decrease in the pressure is detected when the terminals separate.

15. The method as recited in claim 12, wherein the step of detecting the pressure comprises the step of measuring a change in resistance of at least one piezoresistor.

16. The method as recited in claim 12, wherein the step of detecting the pressure comprises the step of measuring a force.

17. The method as recited in claim 16, wherein the step of measuring the force comprises the step of measuring a change in a polymer layer disposed between a first and second conductive layers.

18. The method as recited in claim 12, further comprising the step of timing a predetermined interval, wherein at the end of the predetermined interval the head is actuated away from the retracted position toward the data area of the disk.

19. The method as recited in claim 12, further comprising the step of locking the head in the retracted position until the pressure is detected.

20. The method as recited in claim 12, wherein the pressure is due to a user holding the mobile device.

21. The method as recited in claim 12, wherein the pressure is due to the mobile device contacting a surface.

22. The method as recited in claim 12, further comprising the steps of:
connecting the mobile device to a docking port; and
disabling the step of detecting the decrease in the pressure while the mobile device is connected to the docking port.

23. A mobile device comprising:
a disk storage system comprising:
a disk;
a head actuated over the disk;
and a preamp for generating a write current applied to the head during a write operation; and
a pressure-sensitive detector for detecting a pressure on the mobile device, and for detecting a decrease in the pressure on the mobile device indicating the mobile device may have been dropped, wherein when the decrease in the pressure is detected the write current is disabled.

24. The mobile device as recited in claim 23, wherein the write current is disabled when the pressure decreases substantially to zero.

25. The mobile device as recited in claim 23, wherein:
the pressure-sensitive detector comprises a first terminal and a second terminal;
the pressure is detected when the terminals are pressed together; and
the decrease in the pressure is detected when the terminals separate.

26. The mobile device as recited in claim 23, wherein:
the pressure-sensitive detector comprises a piezoelectric sensor comprising at least one piezoresistor; and
the resistance of the piezoresistor changes when pressure is applied to the piezoelectric sensor.

27. The mobile device as recited in claim 23, wherein the pressure-sensitive detector comprises a force sensor.

28. The mobile device as recited in claim 27, wherein the force sensor comprises a polymer layer disposed between a first and second conductive layers.

29. The mobile device as recited in claim 23, further comprising a timer for timing a predetermined interval, wherein at the end of the predetermined interval the write current is enabled.

30. The mobile device as recited in claim 23, wherein the write current is disabled until the pressure-sensitive detector detects the pressure.

31. The mobile device as recited in claim 23, wherein the pressure is due to a user holding the mobile device.

32. The mobile device as recited in claim 23, wherein the pressure is due to the mobile device contacting a surface.

33. The mobile device as recited in claim 23, wherein:
the mobile device further comprises interface circuitry for connecting to a docking port; and
the pressure-sensitive detector is disabled while the mobile device is connected to the docking port.

34. A method of operating a mobile device, the mobile device comprising a disk storage system comprising a disk and a head actuated over the disk, a write current is applied to the head during a write operation, the method comprising the steps of:
detecting a pressure on the mobile device;
detecting a decrease in the pressure on the mobile device indicating the mobile device may have been dropped; and
disabling the write current when the decrease in the pressure is detected.

35. The method as recited in claim 34, wherein the step of disabling the write current is executed when the pressure decreases substantially to zero.

36. The method as recited in claim 34, wherein:
the pressure is detected when a first terminal and a second terminal are pressed together; and
the decrease in the pressure is detected when the terminals separate.

37. The method as recited in claim 34, wherein the step of detecting the pressure comprises the step of measuring a change in resistance of at least one piezoresistor.

38. The method as recited in claim 34, wherein the step of detecting the pressure comprises the step of measuring a force.

39. The method as recited in claim 38, wherein the step of measuring the force comprises the step of measuring a change in a polymer layer disposed between a first and second conductive layers.

40. The method as recited in claim 34, further comprising the step of timing a predetermined interval, wherein at the end of the predetermined interval the write current is enabled.

41. The method as recited in claim 34, wherein the write current is disabled until the pressure is detected.

42. The method as recited in claim 34, wherein the pressure is due to a user holding the mobile device.

43. The method as recited in claim 34, wherein the pressure is due to the mobile device contacting a surface.

44. The method as recited in claim 34, further comprising the steps of:

connecting the mobile device to a docking port; and disabling the step of detecting the decrease in the pressure while the mobile device is connected to the docking port.

* * * * *